Dec. 27, 1938.  A. W. LENHART  2,141,274
PIPE PLUGGING DEVICE
Filed May 10, 1937

Arthur W. Lenhart
INVENTOR

ATTORNEY

Patented Dec. 27, 1938

2,141,274

UNITED STATES PATENT OFFICE 2,141,274

PIPE PLUGGING DEVICE

Arthur W. Lenhart, Tulsa, Okla.

Application May 10, 1937, Serial No. 141,848

4 Claims. (Cl. 29—84)

The invention relates to pipe plugging devices adapted for use anywhere it is desired to plug a pipe line, particular through the port of a valve, and one which is particularly adapted for use in connection with oil pipe lines, or oil well casings where it is desired to plug the casing for renewing worn out master gate valves carried by a well casing.

A further object is to provide a pipe plugging device comprising a member adapted to be anchored to a valve casing and having slidably and axially movable therein a rotatable plug expanding sleeve and a plug carrying rod axially movable in the sleeve, and also rotatably movable in the sleeve for forcing the plug to position within a pipe through a valve port for the expanding operation and for disconnecting the device as a whole from the plug after an expanding operation.

A further object is to provide the expansible plug with a threaded shaft on which is slidably mounted an expansion cone, which is forced toward the plug by a nut threaded on the shaft, and which nut is received and turned by the inner end of the rotatable sleeve. Also to provide the threaded shaft with a portion having a reverse thread to the other portion thereof, and on which the inner axially movable shaft is threaded for holding the plug against inward movement and in a predetermined position during the rotation of the rotatable sleeve for a plug expanding operation.

A further object is to provide a yoke head through which the sleeve and operating shaft extend, and the head with an extension sleeve adapted to be threaded into the outer side of the valve casing.

A further object is to provide the outer end of the yoke with an operating screw extending therethrough and having a swivel connection to the axially movable operating shaft.

A further object is to provide a packing gland connection between the yoke head and the rotatable sleeve and between the rotatable sleeve and the operating shaft, for preventing leakage.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
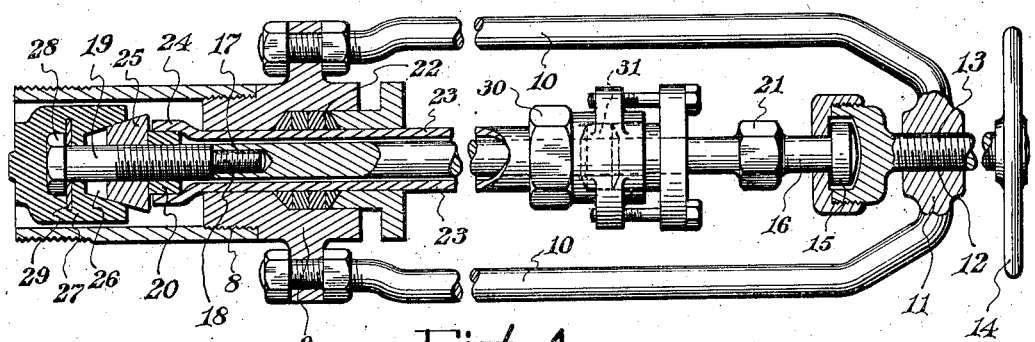
Figure 1 is a horizontal sectional view through the device, parts being shown in elevation to better show the structure.

Referring to the drawing, the numeral 1 designates the main pipe line and 2 a gathering line, through which oil is pumped to the main line. Pipe systems of this character extend over a large area and the gathering lines serve small operators so that the oil may be pumped into the main line and conveyed to any suitable point of discharge or storage. From time to time it is necessary to disconnect particular gathering lines from the service, and this can not be done simply by closing the control valve 3 in the gathering line, as it is obvious the valves may be opened by unauthorized persons or accidentally left open.

Although the device is described for use in connection with a gathering line, it is to be understood it may be used in connection with any kind of line, or in connection with a well casing having a master valve thereon, and where it is desired to renew the valve in case of wear.

The pipe plugging device comprises a coupling member 4, adapted to be threaded at 5 into the valve casing 6, and in axial alinement with the valve port 7. Threaded at 8 into the outer end of the coupling 4 is a yoke head 9, to which are connected the yoke ends 10 of the device. The yoke arms 10 are connected together by a transverse portion 11, in which is threaded at 12 an operating screw 13, which is preferably provided with a hand wheel 14, adapted to be rotated for axially moving the operating screw 13. Pivotally connected to the operating screw 13 at 15 is a plug holding shaft 16, which extends through the yoke head 9 and has threaded at 17 therein, the reduced left handed threaded portion 18 of the stopper carried threaded shaft 19. It will be noted that the thread on the reduced portion 18, and on the threaded shaft 19 are reverse, that is right and left handed, consequently it will be seen that when the nut 20, on the threaded shaft 19, is rotated for a stopper expanding operation, the stopper and threaded shaft 19 will not rotate therewith, particularly when the operating shaft 16 is held against rotation by a wrench applied to the wrench receiving portion 21 of the shaft 16. Rotatably mounted within the packing gland 22, carried by the yoke head 9, is an operating sleeve 23, the inner end of which terminates in a socket wrench portion 24, which receives the nut 20 for rotating the same and threading the nut against the frustoconically shaped stopper expanding member 25.

As the expanding member 25 is forced into the frustoconically shaped recess 26 in the expansible stopper 27, said stopper is expanded against the inner periphery of the gathering line 2, thereby forming a leakproof stopper within the pipe to the inside of the valve 3 through the port 7 and in a position where it can not be reached and removed by unauthorized persons. The stopper 27 may be formed from any kind of material, for instance lead and the threaded shaft 19 is provided with an angularly shaped head 28 imbedded therein for preventing rotation of the threaded shaft in the stopper, and for preventing the head from tearing out of the stopper a washer 29 is provided.

Figure 2:
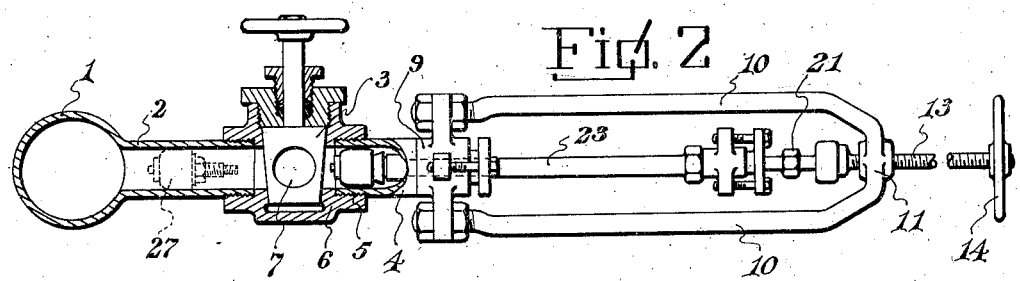
Figure 2 is a vertical longitudinal sectional view through the device and a portion of a main oil and gathering line, showing the plug in position to be passed through the valve when rotated to open position and in dotted lines the position of the plug after it has been applied.
Figure 3:
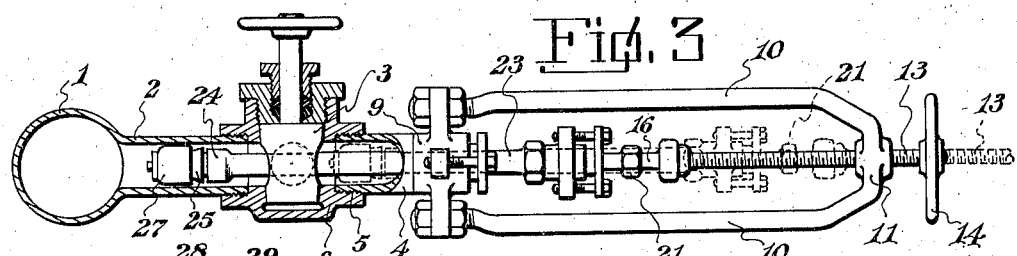
Figure 3 is a view similar to Figure 2, but showing in full lines the position of the parts after the plug has been passed through the valve, and to a position to be expanded.
Figure 4:
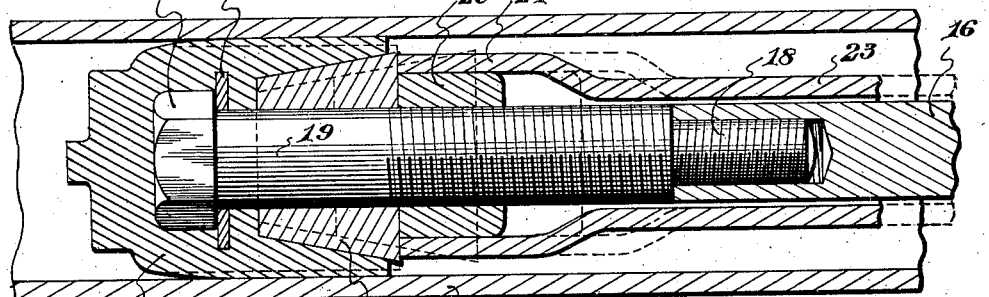
Figure 4 is a vertical longitudinal sectional view through a portion of the gathering line and the plug showing in full lines the expanded position of the parts of the plug and the tool.

In operation, the tool is placed on the valve casing 7 in the position shown in Figure 2 and then the valve 3 is moved to open position with its port 7 in axial position, and after which the operator places a wrench on the wrench receiving portion 21 of the shaft 16, and holds the shaft 16 against rotation. A wrench is then placed on the wrench receiving portion 30 of the sleeve 23, and the sleeve is rotated. It will be noted that as the sleeve 23 is rotated, the stopper expanding member 25 is forced into the chamber 26 of the stopper and the stopper is expanded into engagement with the inner periphery of the gathering line. Immediately before this operation, the threaded shaft 13 is threaded inwardly to force the stopper through the valve port 7 to its dotted line position in the gathering line 2 in Figure 2, and the full line position shown in Figure 3. To further prevent leakage during the expanding operation, a second packing gland 31 is provided between the sleeve 23 and the operating shaft 16, therefore it will be seen that no leakage can take place during the plug applying operation, and any drainage after the stopper applying operation will be to the outside of the stopper.

From the above it will be seen that a stopper applying device is provided for pipe lines, and one particularly adapted for applying and expanding a stopper to the inside of a valve. It will also be seen that the device is provided with means whereby it is rigidly held in axial alinement with the valve port axis and in the valve casing.

It will be noted by providing left hand threads on the reduced threaded portion 18 of the threaded shaft 19, which is provided with right hand threads, that during the stopper expanding operation the threaded shaft 19 will be held against rotation. It will also be seen that after the expanding operation the shaft 16 may be rotated so it will unscrew from the threaded portion 18, thereby allowing the yoke head to be removed from position along with the coupling 4. Of course, during this removal operation, the frictional engagement of the expansible stopper, with the coupling periphery, will prevent the threaded shaft 19 from rotating.

The invention having been set forth what is claimed as new and useful is:

1. A stopper applying and expanding tool, said tool comprising a coupling sleeve adapted to be threaded into a pipe in axial alinement therewith, a yoke head carried by said coupling, a yoke carried by the yoke head, a packing gland carried by said head, an axially movable shaft extending through the head and gland, means threaded through said yoke and bearing against said shaft for axially moving the same, a rotatable sleeve carried by the shaft and extending through the packing gland of the head, a right and left handed threaded shaft carried by the operating shaft and adapted to non-rotatably carry an expansible stopper and means carried by the sleeve and adapted to cooperate with the stopper for expanding the same within a pipe, a screw socket in the end of said operating shaft, one set of threads of said threaded shaft cooperating with said socket to couple the first shafts and the other set of threads cooperating with said stopper operating means whereby the threaded shaft will be prevented from rotating during a stopper expanding operation.

2. A device as set forth in claim 1, including a packing connection between the rotatable sleeve and the operating shaft within the yoke.

3. A device as set forth in claim 1 including a threaded shaft carried by the yoke and pivotally connected to the outer end of the axially movable shaft, said threaded shaft forming means whereby the operating shaft may be axially moved inwardly or outwardly and independently rotated when desired.

4. A device as set forth in claim 1 including tool receiving members carried by the sleeve and the operating shaft and forming means whereby either shaft may be rotated as desired.

ARTHUR W. LENHART.